United States Patent
Clark et al.

(10) Patent No.: US 8,058,193 B2
(45) Date of Patent: *Nov. 15, 2011

(54) THIN-LAYER LIGNOCELLULOSE COMPOSITES AND METHODS OF MAKING THE SAME

(75) Inventors: Randy Jon Clark, Klamath Falls, OR (US); Kenneth Dale Kiest, Klamath Falls, OR (US)

(73) Assignee: JELD-WEN, inc., Klamath Falls, OR (US)

( * ) Notice: Subject to any disclaimer, the term of this patent is extended or adjusted under 35 U.S.C. 154(b) by 179 days.

This patent is subject to a terminal disclaimer.

(21) Appl. No.: 12/316,321

(22) Filed: Dec. 11, 2008

(65) Prior Publication Data

US 2010/0151229 A1 Jun. 17, 2010

(51) Int. Cl.
*B32B 21/10* (2006.01)
*B32B 27/04* (2006.01)
*B32B 27/12* (2006.01)
*B32B 5/02* (2006.01)

(52) U.S. Cl. ............. 442/413; 428/326; 428/425.1; 442/149; 442/153

(58) Field of Classification Search .......... 442/413, 442/149, 153; 428/326, 425.1
See application file for complete search history.

(56) References Cited

U.S. PATENT DOCUMENTS

| | | |
|---|---|---|
| 619,676 A | 2/1899 | Cronin |
| 670,939 A | 4/1901 | Rapp |
| 877,922 A | 2/1908 | Gager |
| 1,183,842 A | 5/1916 | Alling |
| D132,040 S | 4/1942 | Cummings |
| 2,343,740 A | 3/1944 | Birmingham |
| 2,682,083 A | 6/1954 | Patton |
| 2,797,450 A | 7/1957 | Ropella |
| 2,831,793 A | 4/1958 | Elmendorf |
| 3,098,781 A | 7/1963 | Greten |
| 3,121,263 A | 2/1964 | Binner |
| 3,212,948 A | 10/1965 | McMahon |
| 3,308,013 A | 3/1967 | Bryant |
| 3,440,189 A | 4/1969 | Sharp et al. |

(Continued)

FOREIGN PATENT DOCUMENTS

CA 57271 10/1986

(Continued)

OTHER PUBLICATIONS

International Publication, International Search Report and Written Opinion for PCT/US2008/012576 dated Mar. 30, 2009.

(Continued)

*Primary Examiner* — Norca L Torres Velazquez
(74) *Attorney, Agent, or Firm* — Stoel Rives LLP

(57) ABSTRACT

In one aspect, the present invention is a thin-layer lignocellulose composite having increased resistance to moisture. The thin-layer lignocellulosic composite includes a mixture of no more than about 95% by weight of a lignocellulosic fiber and at least about 5% by weight of an organic isocyanate resin. The mixture further includes short fibers and a release agent that does not interfere with subsequent processing of the thin-layer lignocellulosic composite. The mixture is pressed between two dies at an elevated temperature and pressure and for a sufficient time to form a thin-layer composite of predetermined thickness, and to allow the isocyanate resin to interact with the lignocellulosic fiber and short fibers such that the resultant thin-layer composite has a predetermined resistance to moisture.

28 Claims, 2 Drawing Sheets

U.S. PATENT DOCUMENTS

| | | |
|---|---|---|
| 3,484,994 A | 12/1969 | Ashby et al. |
| 3,512,304 A | 5/1970 | Meuret |
| 3,533,190 A | 10/1970 | Hilfinger et al. |
| 3,546,841 A | 12/1970 | Smith et al. |
| 3,576,092 A | 4/1971 | Halpern |
| 3,616,120 A | 10/1971 | Warwick |
| D222,775 S | 12/1971 | Sartori |
| 3,639,200 A | 2/1972 | Elmendorf et al. |
| 3,760,543 A | 9/1973 | McAllister |
| 3,773,587 A | 11/1973 | Flewwelling |
| 3,793,125 A | 2/1974 | Kunz |
| 3,796,586 A | 3/1974 | Hanion et al. |
| 3,824,058 A | 7/1974 | Axer et al. |
| 3,899,860 A | 8/1975 | Newell |
| 3,919,017 A | 11/1975 | Shoemaker et al. |
| 3,987,599 A | 10/1976 | Hines |
| D244,736 S | 6/1977 | Palka |
| D245,824 S | 9/1977 | Palka |
| 4,072,558 A | 2/1978 | Akerson |
| 4,077,833 A | 3/1978 | Roberts |
| 4,100,138 A | 7/1978 | Bilow et al. |
| 4,100,328 A | 7/1978 | Gallagher |
| 4,104,828 A | 8/1978 | Naslund et al. |
| 4,142,007 A | 2/1979 | Lampe et al. |
| 4,146,662 A | 3/1979 | Eggers et al. |
| 4,183,187 A | 1/1980 | Simard |
| 4,236,365 A | 12/1980 | Wheeler |
| 4,246,310 A | 1/1981 | Hunt et al. |
| 4,248,163 A | 2/1981 | Caughey et al. |
| 4,268,565 A | 5/1981 | Luck et al. |
| 4,277,428 A | 7/1981 | Luck et al. |
| D266,042 S | 9/1982 | Moore et al. |
| D266,720 S | 11/1982 | Moore et al. |
| 4,359,507 A | 11/1982 | Gaul et al. |
| 4,361,612 A | 11/1982 | Shaner et al. |
| 4,364,984 A | 12/1982 | Wentworth |
| 4,376,088 A | 3/1983 | Prather |
| 4,388,138 A | 6/1983 | Brown et al. |
| 4,396,673 A | 8/1983 | Ball et al. |
| 4,441,296 A | 4/1984 | Grabendike et al. |
| D274,107 S | 6/1984 | Gordon |
| D274,944 S | 7/1984 | Coppa |
| 4,503,115 A | 3/1985 | Hemies et al. |
| 4,544,440 A | 10/1985 | Wheeler |
| 4,550,540 A | 11/1985 | Thorn |
| 4,552,797 A | 11/1985 | Munk et al. |
| D282,426 S | 2/1986 | Heimberger et al. |
| 4,579,613 A | 4/1986 | Belanger |
| 4,610,900 A | 9/1986 | Nishibori |
| 4,610,913 A | 9/1986 | Barnes |
| D286,177 S | 10/1986 | Case et al. |
| 4,622,190 A | 11/1986 | Schultz |
| 4,643,787 A | 2/1987 | Goodman |
| D292,766 S | 11/1987 | Palka |
| 4,706,431 A | 11/1987 | Corvese |
| 4,720,363 A | 1/1988 | Mayumi et al. |
| 4,740,575 A | 4/1988 | Nguyen et al. |
| 4,742,144 A | 5/1988 | Nguyen et al. |
| 4,781,876 A | 11/1988 | Kia |
| 4,811,538 A | 3/1989 | Lehnert |
| 4,830,929 A | 5/1989 | Ikeda et al. |
| 4,853,062 A | 8/1989 | Gartland |
| 4,876,838 A | 10/1989 | Hagemeyer |
| D304,983 S | 12/1989 | Palka |
| 4,896,471 A | 1/1990 | Turner |
| 4,897,975 A | 2/1990 | Artwick et al. |
| 4,901,493 A | 2/1990 | Thorn |
| 4,908,990 A | 3/1990 | Yoon et al. |
| 4,914,844 A | 4/1990 | Seery |
| 4,942,081 A | 7/1990 | Reiniger |
| 4,942,084 A | 7/1990 | Prince |
| D311,957 S | 11/1990 | Hall |
| D314,242 S | 1/1991 | Mikolaitis |
| D314,625 S | 2/1991 | Hall |
| 5,009,821 A | 4/1991 | Weaver |
| 5,016,414 A | 5/1991 | Wang |
| D319,884 S | 9/1991 | Hall |
| 5,074,087 A | 12/1991 | Green |
| 5,074,092 A | 12/1991 | Norlander |
| 5,075,059 A | 12/1991 | Green |
| 5,096,945 A | 3/1992 | Sun |
| 5,142,835 A | 9/1992 | Mrocca |
| 5,167,105 A | 12/1992 | Isban et al. |
| D335,982 S | 6/1993 | Brandon |
| 5,219,634 A | 6/1993 | Aufderhaar |
| D338,718 S | 8/1993 | Izzo |
| 5,239,799 A | 8/1993 | Bies et al. |
| 5,262,217 A | 11/1993 | Blaauw |
| 5,293,726 A | 3/1994 | Schick |
| D349,352 S | 8/1994 | Csat |
| 5,344,484 A | 9/1994 | Walsh |
| 5,355,654 A | 10/1994 | Stanley |
| 5,369,869 A | 12/1994 | Bies et al. |
| 5,397,406 A | 3/1995 | Vaders et al. |
| 5,401,556 A | 3/1995 | Ishitoya et al. |
| 5,401,588 A | 3/1995 | Garvey et al. |
| 5,443,891 A | 8/1995 | Bach |
| 5,470,631 A | 11/1995 | Lindquist et al. |
| D366,939 S | 2/1996 | Schafernak |
| D367,121 S | 2/1996 | Schafernak |
| D370,269 S | 5/1996 | Schafernak |
| D371,852 S | 7/1996 | Schafernak |
| 5,543,234 A | 8/1996 | Lynch et al. |
| 5,554,438 A | 9/1996 | Marcinko et al. |
| 5,560,168 A | 10/1996 | Gagne et al. |
| D375,424 S | 11/1996 | Burwick |
| 5,603,881 A | 2/1997 | Hanna |
| 5,634,508 A | 6/1997 | Herbst |
| D382,350 S | 8/1997 | Lynch |
| 5,677,369 A | 10/1997 | Walsh |
| D388,196 S | 12/1997 | Schafernak et al. |
| 5,766,774 A | 6/1998 | Lynch et al. |
| 5,782,055 A | 7/1998 | Crittenden |
| 5,829,218 A | 11/1998 | Murray et al. |
| 5,887,402 A | 3/1999 | Ruggie et al. |
| 5,900,463 A | 5/1999 | Tanimoto et al. |
| D411,022 S | 6/1999 | Schafemak et al. |
| 5,908,496 A * | 6/1999 | Singule et al. ............... 106/271 |
| 5,919,554 A | 7/1999 | Watterson et al. |
| 5,941,032 A | 8/1999 | Lydon, Jr. |
| 5,950,382 A | 9/1999 | Martino |
| 5,954,962 A | 9/1999 | Adiletta |
| 5,972,266 A | 10/1999 | Fookes et al. |
| 5,985,429 A | 11/1999 | Plummer et al. |
| 6,024,908 A | 2/2000 | Koncelik |
| D426,645 S | 6/2000 | Bonomo et al. |
| 6,073,419 A | 6/2000 | Moyes |
| 6,092,343 A | 7/2000 | West et al. |
| 6,200,687 B1 | 3/2001 | Smith et al. |
| 6,209,172 B1 | 4/2001 | Bradley |
| 6,231,656 B1 | 5/2001 | Dekerf et al. |
| 6,277,943 B1 | 8/2001 | Sharpeshkar et al. |
| 6,288,255 B1 | 9/2001 | Skinner |
| 6,309,503 B1 | 10/2001 | Martino |
| 6,312,540 B1 | 11/2001 | Moyes |
| 6,313,184 B1 | 11/2001 | Sasaki et al. |
| 6,335,082 B1 | 1/2002 | Martino |
| 6,368,528 B1 | 4/2002 | Whelan et al. |
| 6,378,266 B1 | 4/2002 | Ellingson |
| 6,401,414 B1 | 6/2002 | Steel et al. |
| 6,434,898 B1 | 8/2002 | Ward et al. |
| 6,458,238 B1 | 10/2002 | Mente et al. |
| 6,464,820 B2 | 10/2002 | Mente et al. |
| 6,470,940 B1 | 10/2002 | Pu et al. |
| 6,485,800 B1 | 11/2002 | Littschwagger et al. |
| 6,487,824 B1 | 12/2002 | West et al. |
| 6,531,010 B2 | 3/2003 | Puppin |
| 6,533,889 B2 | 3/2003 | Dueholm |
| 6,588,162 B2 | 7/2003 | Lynch et al. |
| 6,596,209 B2 | 7/2003 | Uhland et al. |
| 6,602,610 B2 | 8/2003 | Smith et al. |
| 6,610,232 B2 | 8/2003 | Jacobsen |
| 6,619,005 B1 | 9/2003 | Chen |
| 6,620,459 B2 | 9/2003 | Colvin et al. |
| 6,702,969 B2 | 3/2004 | Matuana et al. |
| 6,730,249 B2 | 5/2004 | Sears et al. |
| 6,740,279 B2 | 5/2004 | West et al. |

| | | | |
|---|---|---|---|
| 6,750,310 | B1 | 6/2004 | Skinner |
| 6,826,881 | B2 | 12/2004 | McGregor |
| 6,866,740 | B2 | 3/2005 | Vaders |
| 6,884,852 | B1 | 4/2005 | Klauck et al. |
| 6,887,911 | B2 | 5/2005 | Shidaker et al. |
| 6,983,684 | B2 | 1/2006 | Husted |
| 7,018,461 | B2 | 3/2006 | Massidda et al. |
| 7,022,414 | B2 | 4/2006 | Davina et al. |
| 7,029,612 | B2 | 4/2006 | Moriarty |
| 7,137,232 | B2 | 11/2006 | Lynch et al. |
| 7,178,308 | B2 | 2/2007 | Fagan et al. |
| 7,284,352 | B2 | 10/2007 | Lynch et al. |
| 7,337,544 | B2 | 3/2008 | Fagan et al. |
| 7,370,454 | B2 | 5/2008 | Lynch et al. |
| 7,390,447 | B1 | 6/2008 | Clark et al. |
| 2001/0001356 | A1 | 5/2001 | West et al. |
| 2002/0005602 | A1* | 1/2002 | Jacobsen |
| 2002/0068161 | A1* | 6/2002 | Matuana et al. |
| 2002/0091218 | A1* | 7/2002 | Ford et al. |
| 2002/0106498 | A1* | 8/2002 | Deaner et al. |
| 2002/0121327 | A1 | 9/2002 | Mente et al. |
| 2002/0155223 | A1 | 10/2002 | Colvin et al. |
| 2002/0160204 | A1 | 10/2002 | Partush |
| 2003/0015122 | A1* | 1/2003 | Moriarty et al. |
| 2003/0030176 | A1 | 2/2003 | Monovoukas et al. |
| 2003/0171457 | A1 | 9/2003 | Matuana et al. |
| 2003/0200714 | A1* | 10/2003 | Minke et al. |
| 2004/0034113 | A1 | 2/2004 | Shidaker et al. |
| 2004/0067353 | A1* | 4/2004 | Miller et al. |
| 2004/0229010 | A1* | 11/2004 | Clark et al. ............... 428/98 |
| 2005/0028465 | A1* | 2/2005 | Horsfall et al. |
| 2005/0200050 | A1* | 9/2005 | Medoff et al. ............ 264/494 |
| 2005/0266222 | A1 | 12/2005 | Higgins |
| 2006/0036004 | A1 | 2/2006 | Wu et al. |
| 2006/0053744 | A1 | 3/2006 | Thompson et al. |
| 2006/0272253 | A1 | 12/2006 | Wolf et al. |
| 2007/0027234 | A1 | 2/2007 | Sigworth et al. |
| 2007/0082997 | A1 | 4/2007 | Pfau |
| 2007/0110979 | A1 | 5/2007 | Clark et al. |
| 2007/0204546 | A1 | 9/2007 | Lynch et al. |
| 2008/0286581 | A1 | 11/2008 | Clark et al. |
| 2009/0001627 | A1 | 1/2009 | Lu et al. |
| 2009/0044471 | A1 | 2/2009 | Harlin et al. |
| 2009/0113830 | A1 | 5/2009 | Clark et al. |
| 2009/0114123 | A1 | 5/2009 | Clark et al. |
| 2009/0176912 | A1 | 7/2009 | Maldas et al. |
| 2009/0264560 | A1 | 10/2009 | Warnes et al. |
| 2010/0021706 | A1 | 1/2010 | Clark et al. |

FOREIGN PATENT DOCUMENTS

| | | |
|---|---|---|
| CA | 1228463 | 10/1987 |
| CA | 2 437 826 | 8/2002 |
| DE | 3801486 A1 | 8/1989 |
| EP | 0 049 299 B1 | 4/1982 |
| EP | 0 103 048 A2 | 3/1984 |
| EP | 0 225 629 B2 | 6/1987 |
| EP | 0 346 640 A1 | 12/1989 |
| EP | 0 688 639 A3 | 3/1996 |
| EP | 0 909 295 B1 | 3/2002 |
| EP | 1 170 456 A1 | 9/2002 |
| EP | 1 529 919 A1 | 5/2005 |
| GB | 2 349 163 A | 10/2005 |
| JP | 10238236 | 9/1998 |
| JP | 11101071 | 4/1999 |
| JP | 11318598 | 11/1999 |
| WO | WO98/32600 | 7/1998 |
| WO | WO 02/64337 | 8/2002 |
| WO | WO2004/076141 | 10/2004 |

OTHER PUBLICATIONS

Premdor, Construction of Premdor Doors, Flush Hollow-Core Series, Premdor Reference Guide, 1998, pp. 27-28.

Response to Office Action dated Dec. 22, 2010 for U.S. Appl. No. 11/983,091.

Office Action dated Jul. 22, 2010 for U.S. Appl. No. 11/983,091.

Response to Election/Restriction dated Apr. 19, 2010 for U.S. Appl. No. 11/983,091.

Requirement for Election/Restriction dated Dec. 18, 2009 for U.S. Appl. No. 11/983,091.

Response to Election/Restriction dated Sep. 8, 2009 for U.S. Appl. No. 11/983,091.

Requirement for Election/Restriction dated Jul. 9, 2009 for U.S. Appl. No. 11/983,091.

International Search Report and Written Opinion for PCT/US2010/56041 dated Jan. 7, 2011.

Office Action dated Apr. 4, 2011 for U.S. Appl. No. 11/983,091.

PCT International Search Report and Written Opinion, completed Jul. 5, 2008, mailed Jul. 14, 2008, PCT/US08/54298, International Filing dated Feb. 19, 2008, JELD-WEN, inc.

Abstract of JP11318598, Nov. 24, 1999, Matsushita Electric Inc. Co. Ltd.

Abstract of JP10238236, Sep. 8, 1998, Okura Industrial Co. Ltd.

PCT Search Report Corresponding to PCT/US2004/005415, mailed on Oct. 28, 2004.*

ABTCO, The Ultimate Source for Next-Generation Building Products, ABT Building Products Corporation, 1996.*

American/Cameo, Profiles, web page at http://www.abtco.com/AmerCam2.htm, as available via the Internet and printed Jun. 17, 2000.*

Article from Panel World, Sep. 2006, entitled Gutex Operation Implements New Process in Wood-Fiber Insulating Board Plant.*

A recorded voluntary standard of the trade published by the U.S. Dept. of Commerce, Commercial Standard CS73-61, Old Growth Douglas Fir, Sitka Spruce and Western Hemlock Doors, 3 pgs., Effective Mar. 20, 1961.*

Architectural Woodwork Quality Standards, Guide Specifications and Quality Certification Program, Fifth Education, The Architectural Woodwork Institute, p. 109, 1988.*

Aurora Brochure, "Elements of Enduring Beauty," dated 2002.*

Barnett Millworks Inc. introduces Mahogany Entry Door Systems, 2000.*

Bayer Polymers America, "Bayer Polymers and Warner Industries LLC Give Standard Steel Garage Doors a Facelift." Web page at http://www.pu2pu.com/htdocs/customers/bayer/Warner.htm, as available via the Internet and printed Sep. 20, 2004.*

Blomberg Window Systems, 2000.*

Core Molding Technologies, web page at http://www.coremt.com; as available via the Internet and printed Feb. 3, 2004.*

Douglas Fir Doors, E. A. Nord Company, Specifications of Pacific Northwest Fir Doors, 3 pages, 1953.*

DuPont Zonyl Fluorochemical Intermediate, Jun. 21, 2003, www.dupont.com/zonyl/pdf/intermediates.pdf.*

Elite Doors Brochure—apparently published in Oct. 1987.*

"Factory-Fitted Douglas Fir Entrance Doors," U.S. Department of Commerce, Commercial Standard CS91-41, Feb. 10, 1941.*

Feirer, John L., Cabinetmaking and Millwork, Chas. A. Bennett Co., Inc., Peoria, IL., pp. 4, 8-14, 145-146, 596-597, 684-687, © 1970.

Fiberglass Non-Textured Entry Systems, Masonite International Corporation, Big Builder, May 2003.

Grand Passage Fiberglass Entrances by Georgia Pacific, 1994.

Gurke, Huntsman Polyurethanes, New Advances in Polymeric MDI Variants, EUROCOAT, Barcelona Spain—Jun. 2002.

Hardboard Siding and Accessories, Pro-1 Hardboard Siding, web page at http://www.abtco.ccom/Harprod.htm, as available via the Internet and printed Jun. 17, 2000.

Hechinger Brochure—dated Mar. 16, 1086.

How to Measure, Entry Door, Door Comparison, web page at http://www.stanleyworks.com/productgroups/doors/comparisons.asp, as available via the Internet and printed Apr. 11, 2002.

Intro 2, Entry Doors, Stanley's Commitment to Quality and Value, web page at http://www.stanleyworks.com/productgroups/doors/comparions.asp, as available via the Internet and printed Apr. 11, 2002.

JELD-WEN Brochure, "Knotty Alder Composite Exterior Doors," dated 2003.

Knock On Wood, Pro Sales, Mar. 2002.

Lifetime Doors, Inc. Welcome to Lifetime Doors, web page at wysiwyg://29/http://www.lifetimedoors.com/Lifetime2.htm, as available via the Internet and printed Jan. 2, 2001.

Lloyd, William B., "Millwork Principles and Practices, Manufacture-Distribution-Use," Cahners Publishing Company, Inc. Chicago, IL., in assoc. with The National Woodwork Manufacturers Association, Inc., pp. VI-XV, 192, 241, 116-117, 167, 173, dated 1966.

Masonite Brand Door Facings—Brochure, 1987.

Ultimate Building Material, Milgard Windows, web page at www.milgard.com, as available via the Internet, 2001.

Mercer, Henry C., Sc. D., "Ancient Carpenter's Tools," The Bucks Historical Society, Doylestown, PA, pp. 131-133, 1960.

Milgard WoodClad Windows and Doors, Milgard Windows, 1998.

Outswing French Door, "Are You Prepared for the Possibilities?" Web page at http://www.marvin.com/showroom/bodies/outswing.asp, as available via the Internet and printed Jun. 19, 2000.

Products, Open Design's Door, Professional Builder, Jun. 1994, p. 127.

Products and Services, Robert Bowden, Inc. Building Materials and Millwork, 2001.

Quality Door Brochure—dated 1988.

Raised Panel Interior Doors by Premdor, Jun. 2000.

Schut, J. H., "Wood is Good for Compounding Sheet and Profile." Plastics Technology Online Article, web page at http://www.webclipping.com/cgi-bin/hl.cgi?a-2925&c=10473&t-3, as available via the Internet and printed Feb. 13, 2001.

Semco Windows and Doors. Web page available at www.semcowindows.com, as available via the Internet and printed Aug. 2000.

Sliding Patio Doors, web page at http://www.lincolnwindows.com/sidoor.htm, as available via the Internet and printed on Jan. 18, 2001.

Suppliers Showcase, "Register at BIS 2004!" web page at http://;www.buildingindustryshow.com/showcase.html, as available via the Internet and printed Sep. 20, 2004.

Sweet's Catalog, Section 8.3/50, p. 7, 1981.

Sweet's Catalog, Section 9.31/MO, p. 3, door in center of page, 1981.

The Finest Material, Dixie Pacific Manufacturing Company, 1996.

"The New Mission Series," product brochure by Nord, Part of the JELD-WEN family, 300 W. Marine View Drive, Everett, WA 98201-1030, 2001.

Therma-Tru Doors, Homeowners, web page at http://www.thermatru.com/homeowner/index.html, as available via the Internet and printed Apr. 11, 2002.

Tucker Millworks, "Climate Seal" Product Line, web page at http://www.tuckermillworks.com/csealintro.htm, as available via the Internet and printed Jan. 24, 2001.

Visador Brochure—date unknown.

What's New in Entry Doors: Manufacturers and Suppliers Offer a Variety of New Ways to Enhance Aesthetics and Performance, Window and Door, Aug. 2000, pp. 75-76.

What You've Come to Expect from Milgard Windows, Building Products, Nov.-Dec. 2001.

Windows and Patio Doors, Lincoln Windows, Brochure, 2000, 57 pages.

"You have precisely one window in mind. Which is why we offer roughly 4,000,000 variations." Milgard Windowsm Residential Architecture, May 2002.

You Won't See G-P Products in the New American Home, George-Pacific, 1994.

* cited by examiner

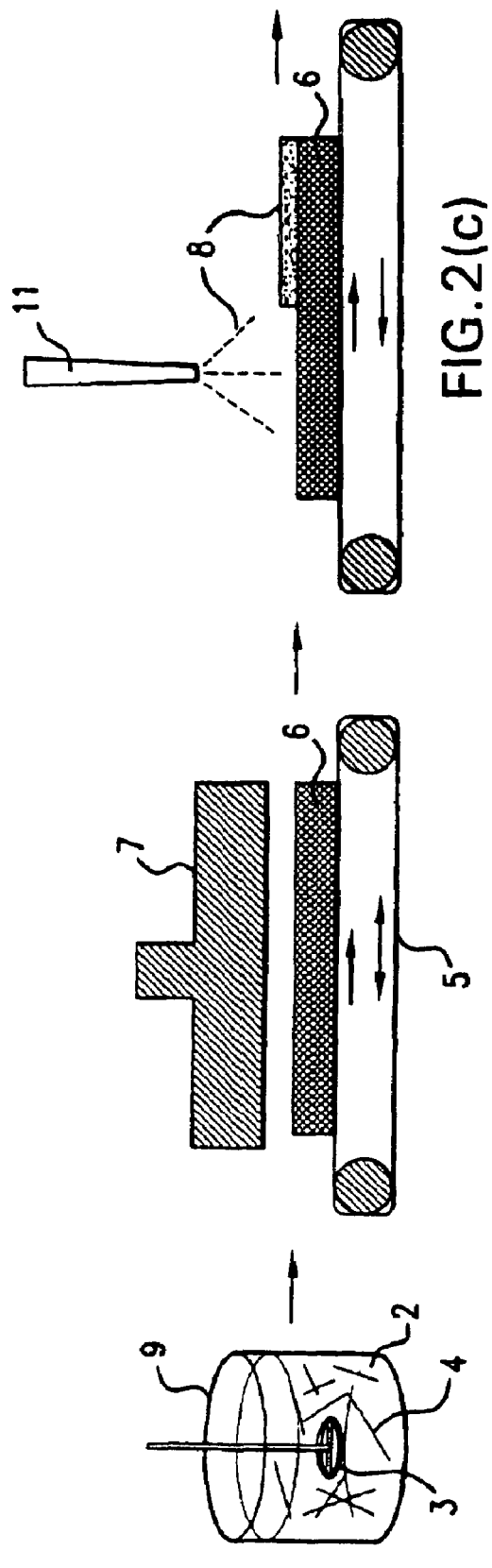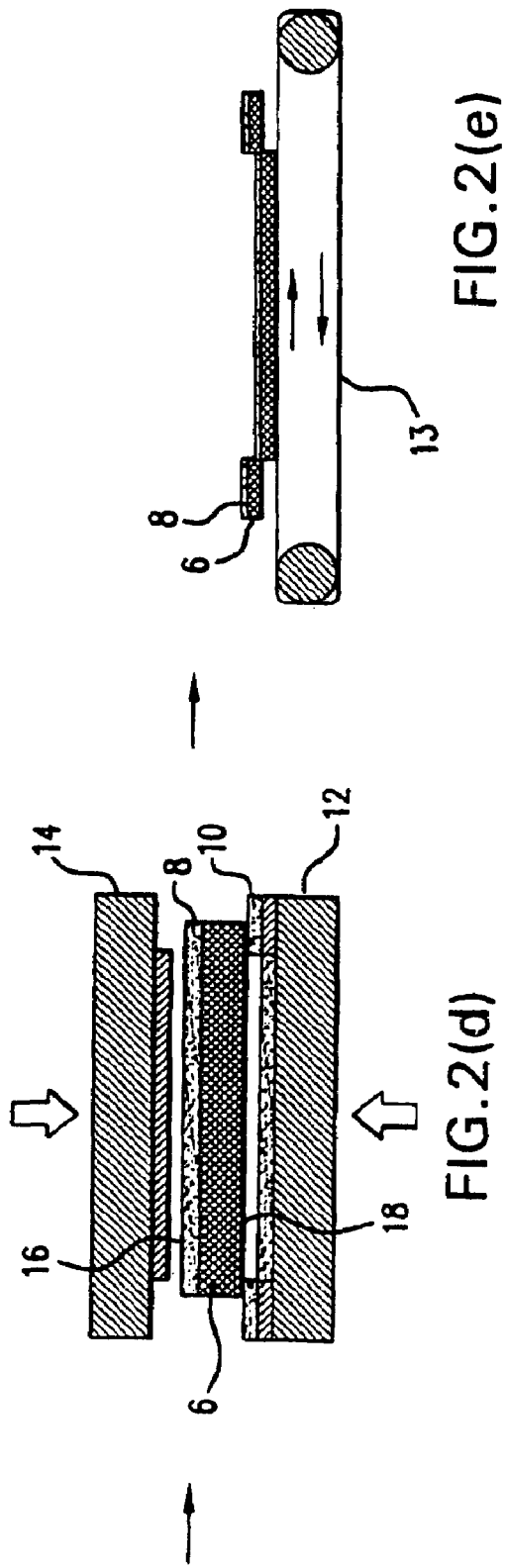

THIN-LAYER LIGNOCELLULOSE COMPOSITES AND METHODS OF MAKING THE SAME

BACKGROUND OF THE INVENTION

The present invention relates to the manufacture of thin-layer lignocellulosic composites, such as wood-based doorskins. More particularly, the present invention relates to thin-layer wood composites that include an isocyanate based-resin and short fibers.

A significant problem in the manufacture of wood-based composite products that are exposed to exterior and extreme interior environments is that upon exposure to variations in temperature and moisture, the wood can lose moisture and shrink, or gain moisture and swell. This tendency to shrink and/or swell can significantly limit the useful lifetime of most interior or exterior wood products, such as wooden doors, often necessitating replacement after only a few years. The problem is particularly prevalent in areas of high moisture (e.g., Hawaii) or in climates that are extremely hot or dry (e.g., Arizona). Shrinking and swelling can also be a problem when the wood is exposed to a wet environment during construction or upon exposure to the dry heat used indoors in the winter.

A possible solution to the problem of moisture gain and loss in wood exposed to the elements includes covering the wood with paint and/or other coatings that act as a barrier to moisture. Such coatings, however, tend to wear off with time, leaving the wood susceptible to the environment.

Rather than treating the unit at the site of installation, it may be desirable to manufacture products that exhibit increased resistance to moisture gain and loss. For example, increasing the amount of resin content or decreasing the amount of wood fiber used in a door can increase resistance to water gain and water loss. However, such modifications can be associated with significantly increased production costs. Other options include the use of metal, fiberglass, or other non-wood doors, but such doors are not always as aesthetically pleasing as wood doors and may have other performance problems associated with the use of these materials.

Alternatively, doors, and other structural units, may be covered with a wood-containing water-resistant layer. For example, doors may be covered with a thin-layer wood. composite known as a doorskin. Doorskins are molded as thin layers to be adhesively secured to an underlying door frame to thereby provide a water-resistant outer surface. Doorskins may be made by mixing, in some examples, wood fiber, wax, and a resin binder, and then pressing the mixture under conditions of elevated temperature and pressure to form a thin-layer wood composite that is then bonded to the underlying door frame.

Wood composite doorskins are traditionally formed by pressing wood fragments in the presence of a binder at temperatures exceeding 275° F. (135° C.). The resin binder used in the doorskin may be a formaldehyde-based resin, an isocyanate-based resin, or other thermoplastic or thermoset resins. Formaldehyde-based resins typically used to make wood composite products include phenol-formaldehyde, urea-formaldehyde, or melamine-formaldehyde resins. Phenol-formaldehyde resins require a high temperature to cure and are sensitive to the amount of water in the wood, because excess water can inhibit the high temperature cure. Urea and melamine-formaldehyde resins do not require as high of a temperature cure, but traditionally do not provide comparable water-resistance (at the same resin content) in the doorskin product.

As compared to doorskins made using phenol-formaldehyde resins, doorskins that utilize high-temperature pressed isocyanate resin binder display increased surface strength. These doorskins, however, exhibit decreased porosity to adhesives and thus, do not bond well to the underlying doorframe. Also, isocyanate-bonded wood composites made using currently available methods and compositions do not consistently exhibit sufficient resistance to environmentally-induced swelling and/or shrinking to be commercially useful.

SUMMARY

In one aspect, the present invention is a thin-layer lignocellulose composite having increased resistance to moisture. The thin-layer lignocellulosic composite includes a mixture of no more than about 95% by weight of a lignocellulosic fiber and at least about 5% by weight of an organic isocyanate resin. The mixture further includes short fibers and a release agent that does not interfere with subsequent processing of the thin-layer lignocellulosic composite. The mixture is pressed between two dies at an elevated temperature and pressure and for a sufficient time to form a thin-layer composite of predetermined thickness and to allow the isocyanate resin to interact with the lignocellulosic fiber and other fibers such that the resultant thin-layer composite has a predetermined resistance to moisture.

In another aspect, the present invention is a method for making thin layer lignocellulosic composites having increased moisture resistance. The method includes forming a mixture comprising at least one type of lignocellulosic fiber having a predefined moisture content and at least 5% by weight of an organic isocyanate resin, a release agent that does not interfere with subsequent processing of the thin-layer composite, and short fibers. The method further includes forming the mixture into a loose mat, shaving off excess mat material to obtain a predetermined weight, pre-pressing the mat, and pressing the mat between two dies at an elevated temperature and pressure to further reduce the thickness of the mat and to promote the interaction of the resin with the lignocellulosic fibers. The resultant thin-layer composite has a predetermined resistance to moisture.

It is to be understood that the invention is not limited in its application to the specific details as set forth in the following description, figures and claims. The invention is capable of other embodiments and of being practiced or carried out in various ways.

BRIEF DESCRIPTION OF THE FIGURES

FIG. 2 shows an embodiment of a method used to make water-resistant thin-layer wood composites in accordance with an embodiment of the present invention where panel (a) shows mixing of the lignocellulosic fiber, short fibers, and resin; panel (b) shows forming the composite into a loose mat; panel (c) shows spraying the loose mat with release agent; panel (d) shows pressing the mat between two dies; and panel (e) shows the resultant thin-layered composite product.

DETAILED DESCRIPTION

Figure 1:
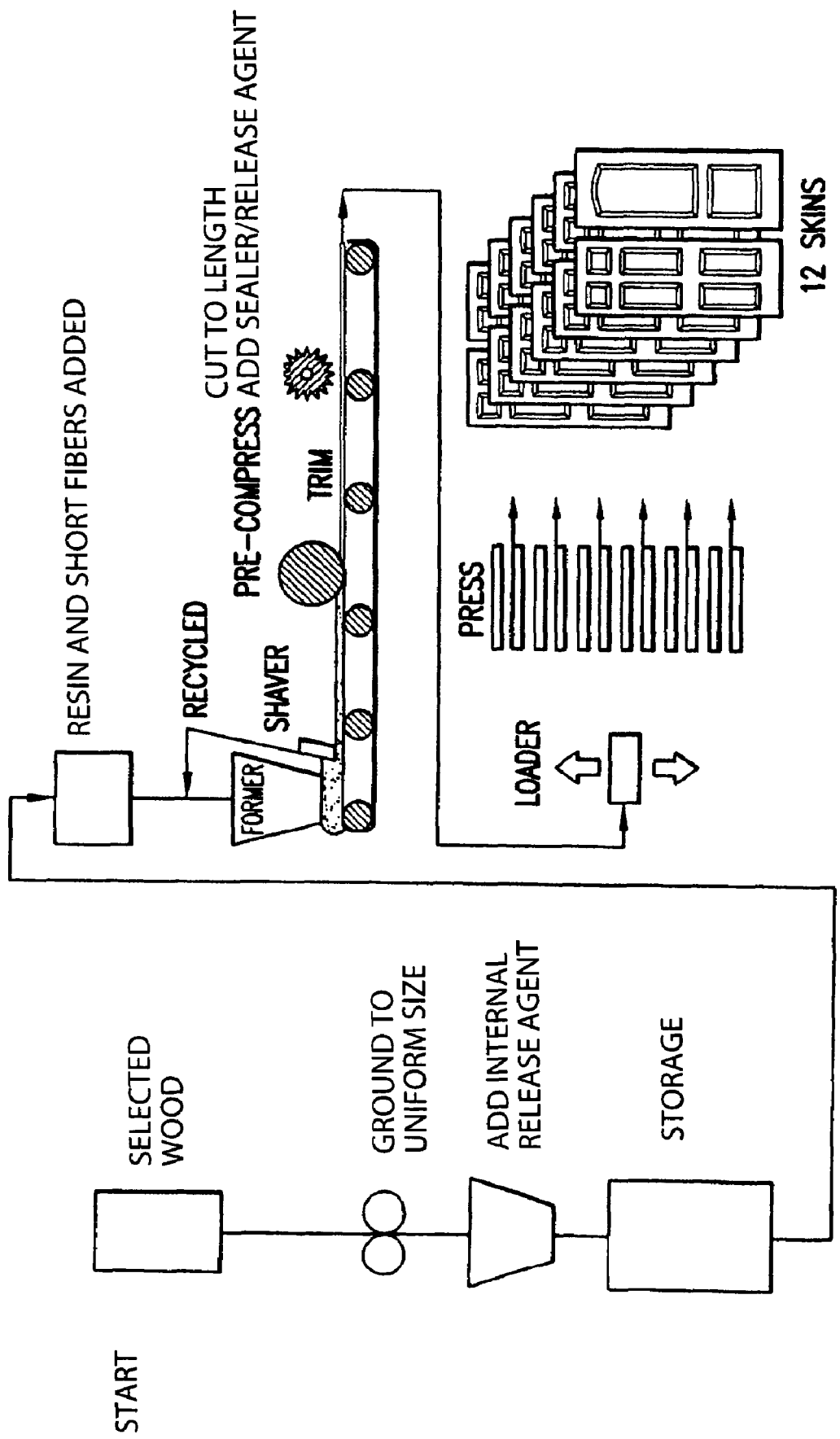
FIG. 1 shows an embodiment of a method that may be used to make a thin-layer wood composite doorskin.

The present invention provides for the manufacture of thin-layer lignocellulosic composites that include levels of isocyanate-based resins and short fibers that protect the composite from shrinking and swelling upon exposure to the elements. The invention may be applied to various types of lignocellulosic thin-layer composites to generate structural units that may be exposed to weathering by heat, moisture, sunlight, air, and the like.

In one aspect, the present invention describes a method to make wood-based doorskins that are resistant to shrinking and swelling.

Thus, in an embodiment, the present invention comprises a method to produce a thin-layer lignocellulosic composite having increased resistance to moisture-induced shrinking and swelling comprising: (a) forming a lignocellulosic composite mixture comprising at least one type of lignocellulosic fiber having a predefined moisture content and at least 5% by weight of an organic isocyanate resin, a release agent that will not interfere with subsequent processing of the thin-layer lignocellulosic composite and short fibers; (b) forming the mixture into a loose mat; and (c) pressing the mat between two dies at an elevated temperature and pressure and for a sufficient time to further reduce the thickness of the mat to form a thin-layer composite of predetermined thickness, and to allow the isocyanate resin to interact with the lignocellulosic fiber and short fibers such that the resultant thin-layer composite has a predetermined resistance to moisture.

The present invention also includes thin-layer lignocellulosic composites made by the methods of the invention. Thus, in another embodiment, the present invention also comprises a thin-layer lignocellulosic composite comprising a mixture of no more than about 95% by weight of at least one type of lignocellulosic fiber and at least about 5% by weight of an organic isocyanate resin. The mixture further includes at lease one release agent that will not interfere with subsequent processing of the composite and short fibers. The mixture is pressed between two dies at an elevated temperature and pressure and for a sufficient time to form a thin-layer composite of predetermined thickness, and to allow the isocyanate resin to interact with the lignocellulosic fiber and short fibers that the resultant thin-layer composite has a predetermined resistance to moisture.

The lignocellulosic fiber comprises a material containing both cellulose and lignin. Suitable lignocellulosic materials may include wood particles, wood fibers, straw, hemp, sisal, cotton stalk, wheat, bamboo, jute, salt water reeds, palm fronds, flax, groundnut shells, hard woods, or soft woods (see e.g., U.S. Pat. No. 6,620,459 for a description of lignocellulosic fibers, incorporated herein by reference). In an embodiment, the lignocellulosic fiber is refined. As used herein, refined fiber comprises wood fibers and fiber bundles that have been reduced in size from other forms of wood, such as chips and shavings. The refined wood fiber is normally produced by softening the larger wood particles with steam and pressure and then mechanically grinding the wood in a refiner to produce the desired fiber size. In an embodiment, the lignocellulosic fiber of the thin-layer composites of the present invention comprise wood fiber.

As used herein, a thin-layer composite comprises a flat, planar structure that is significantly longer and wider than it is thick. Examples of thin-layer lignocellulosic composites include wood-based doorskins that are used to cover the frame of a door to provide the outer surface of the door. Such doorskins may be only about 1 to about 13 mm thick, but may have a surface area of about 20 square feet (about 1.86 square meters) or more. Other thin-layer lignocellulosic products may include Medium Density Fiberboard (MDF), hardboard, particleboard, Oriented Strand Board (OSB) and other panel products made with wood. These products are normally about 3 to about 20 mm in thickness.

In an embodiment, the lignocellulosic composite mixture further comprises at least one type of wax. For example, the mixture may comprise up to about 2% by weight of wax. In an embodiment, about 0.5% by weight wax is used.

The wax may impart additional short-term water repellency to the wood composite. The type of wax used is not particularly limited, and waxes standard in the art of wood fiber processing may be used. Generally, the wax should be compatible with the temperatures used for pressing the wood/resin mixture into a thin layer, increase the water repellency of the wood, and not adversely affect the aesthetics or subsequent processing (such as priming or gluing) of the wood composite. Thus, the wax may be a natural wax or a synthetic wax, generally having a melting point in the range of about 120° F. (49° C.) to about 180° F. (82° C.). Waxes used may include, but are not limited to, paraffin wax, polyethylene wax, polyoxyethylene wax, microcrystalline wax, shellac wax, ozokerite wax, montan wax, emulsified wax, slack wax, and combinations thereof.

In another embodiment, the mixture is substantially free of added wax. As used herein, the term "added wax" is intended to include wax added to the mixture as a distinct component. Similarly, as used herein, "substantially free of added wax" is intended to include composites having no wax, as well as composites having a negligible amount of wax at concentrations that would not materially affect the composites, where the wax is a part of a different component of the mixture, for example the tackifier and/or release agent. For example, a composite having less than about 0.1% wax may be encompassed by the term "substantially free of added wax." In some embodiments, the composite is free of added wax. In some embodiments, various components, such as, for example, the tackifier or the release agent, may include certain amounts of wax. Embodiments in which the tackifier and/or the release agent include wax are considered to be substantially free of added wax.

In yet another embodiment, the mixture is substantially free of wax. As used herein, the term "substantially free of wax" means that the recited components of the mixture contain, at most, negligible amounts of wax. Where wax is included as a part of the recited components and the mixture is substantially free of wax, this means that the wax is present in amounts that do not have a measurable effect on the physical characteristics of the present thin-layer composites.

Additionally or alternatively, the term "substantially free of wax" means that wax is not included in the mixture in amounts that have a measurable effect on the physical characteristics of the present thin-layer composites.

In some embodiments, the mixture is free of wax.

As described herein, the lignocellulosic mixtures of the present invention are pressed into thin-layers using flat or molded dies at conditions of elevated temperature and pressure. In an embodiment, the mixture is initially formed into a loose mat and the mat is placed in the die press. Because the composite includes amounts of resin that are sufficient to increase the water resistance of the composite mixture, the composite may stick to the surface of the dies that are used to press the mat into the resultant thin layer composite. Thus, in an embodiment, the method includes steps to reduce sticking of the thin-layer composite to the dies.

In an embodiment, the method includes exposing the lignocellulosic composite mixture to a release agent prior to pressing the composite between the dies. In an embodiment, the release agent comprises an aqueous emulsion of surfactants and polymers. For example, the release agent may comprise compounds used in the doorskin manufacturing industry such as, but not limited to, AQUACER™ 593, HEXION™ 40, PAT® 7299/D2 or PAT® 1667 (Wurtz GmbH & Co., Germany).

The release agent may be added directly to the lignocellulosic composite mixture as an internal release agent prior to refining into fibers or prior to pre-pressing the mixture into a loose mat. Alternatively and/or additionally, the release agent may be sprayed on a surface of the mat before the mat is pressed into a thin layer.

Where the release agent is added directly to the mixture as an internal release agent, the amount of release agent added may range from about 0.05 to about 5 weight percent of the mixture. In one embodiment, from about 0.05 to about 1 weight percent release agent is used.

Where the release agent is sprayed onto a surface of the mat, the amount of release agent sprayed on to the mat surface may comprise from about 0.1 to about 8.0 grams per square foot (1.1 to 86.1 grams per square meter) of mat surface. In another embodiment, the amount of release agent sprayed on the mat surface may comprise about 4 grams per square foot (43 grams per square meter) of mat surface. The release agent may be applied as an aqueous solution. In an embodiment, an aqueous solution of about 25% release agent is applied to the mat surface. When the thin-layer composite comprises a doorskin, the release agent may be applied to the surface of the mat that corresponds to the surface that will become the outer surface of the doorskin.

In an embodiment, the thin-layered lignocellulosic composite is colored. For example, in one embodiment, the release agent may comprise a pigment. In this way, an even coloring is applied to the thin-layered lignocellulosic composite.

In embodiments where a wax is included in the mixture, the release agent and the wax are chemically different from each other.

In some embodiments, the release agent may be a silicone release agent.

The present thin-layer composites further include short fibers. The short fibers may be present in the composite mixture in an amount from about 2% to about 40% by weight of the total composition, in some embodiments, from about 5% to about 8% by weight of the total composition.

Short fibers contemplated as useful in accordance with the present invention may have an average fiber length of from about 0.03 inches to about 2.0 inches, in some embodiments, from about 0.06 inches to about 1.5 inches. Stated differently, at least about 90% by weight of the short fibers have a length less than about 1.5 inches. In some embodiments at least about 99% by weight of the short fibers have a length less than about 1.5 inches.

Utilizing short fibers in the present composition unexpectedly resulted in improved surface quality and appearance of the present composites as compared to composites made with long fiber fiberglass (from about 1.5 inches to about 3 inches). Without being bound by theory, it is believed that the greater stiffness and continuous length of the longer fibers results in greater thickness of the composite mixture prior to pressing, resulting in excessive migration of the various components in the mixture prior to pressing and, therefore, a less uniform composite.

Short fibers contemplated as useful in accordance with the present invention include one or more of fiberglass, polyester fibers, polyamide fibers, carbon fibers, and other fibers known in the art.

The short fibers may be generated by methods known in the art. For example short fibers may be generated by subjecting longer fibers to one or more of milling, breaking, and chopping. Other methods of converting long fibers to short fibers may be known in the art and are contemplated as useful in accordance with the present invention.

Thus, the thin-layer lignocellulosic composites of the present invention may comprise wood fibers as well as short fibers and a release agent. For example, in an embodiment, the present invention comprises a wood composite comprising a mixture of: (i) no more than about 95% by weight of a wood fiber, wherein the wood fiber has a predetermined moisture content; (ii) at least about 5% by weight of an organic isocyanate resin; (iii) at least about 2% by weight short fibers; and (iv) at least about 0.5% internal release agent by weight and/or at least about 0.1 grams release agent per square foot (about 1.1 grams per square meter) on the surface of the composite.

Other strategies may be used to reduce sticking of the lignocellulosic composite to the dies used for making the resultant thin-layer composite. Thus, in another embodiment, at least one surface of the die used to press the mat is exposed to an anti-bonding agent. In an embodiment, exposing the die to an anti-bonding agent may comprise coating at least one of the dies used to press the mat with an anti-bonding agent. In an embodiment, coating the die may comprise baking the anti-bonding agent onto the die surface.

In an embodiment, the release agent is not the same as an anti-bonding agent. The release agent comprises a compound that will not interfere with subsequent processing of the resulting thin-layer composite. In contrast, the anti-bonding agent may comprise compositions known in the art of pressing wood composites as being effective in preventing sticking to the pressing dies, but that may be problematic if included as part of the composite.

For example, in an embodiment, the anti-bonding agent used to coat the die surface comprises silane or silicone. Thus, the anti-bonding agent used to coat the die surface may comprise anti-bonding agents known in the art of die pressing such as, but not limited to, CrystalCoat MP-313 and Silvue Coating (SDC Coatings, Anaheim, Calif.), Iso-Strip-23 Release Coating (ICI Polyurethanes, West Deptford, N.J.), aminoethylaminopropyltrimethoxysilane (Dow Corning Corporation), 7004W (Chemtrend, Howell, Mich.), or the like.

For thin-layer doorskins, the die that is coated with the anti-bonding agent may preferably correspond to the die used to press the outside surface of the doorskin. Alternatively, both dies may be coated with an anti-bonding agent. In an embodiment, the amount of anti-bonding agent used to coat the die surface may range in thickness from about 0.0005 to about 0.010 inches (i.e., about 0.0127 mm to about 0.254 mm). Thus, in one embodiment, the amount of anti-bonding agent used to coat the die surface comprises about 0.003 inches (i.e., about 0.0762 mm).

In an embodiment, coating the die comprises baking the anti-bonding agent onto the die surface. For example, in one embodiment, the step of baking the anti-bonding agent onto the die surface may comprise: (1) cleaning the die surface free of all contaminants, such as dirt, dust and grease; (ii) spraying from about 0.0005 to about 0.010 inches (about 0.5 to about 10 mils or about 0.0127 to about 0.254 mm) of a 50% solution of the anti-bonding agent onto the die; and (iii) baking the die at greater than about 300° F. (about 149° C.) for about 1 to about 4 hours.

In an embodiment, the step of exposing the pre-pressed mat to at least one release agent and/or anti-bonding agent may comprise adding an internal release agent and/or spraying one side of the mat with a release agent and also coating at least one die surface with an anti-bonding agent. In this embodiment, the side of the mat coated with the release agent is the surface opposite to the surface of the mat exposed to the coated die. For example, in an embodiment, the present invention comprises a method to produce a thin-layer wood composite having increased water resistance comprising: (a) forming a mixture comprising: (i) a refined wood fiber comprising a predefined moisture content; (ii) short fibers; (iii) at least about 5% by weight of an organic isocyanate resin; and (iv) a release agent; (b) pre-pressing the mixture into a loose mat; (c) optionally, spraying one surface of the mat with a release agent; and (d) pressing the mat between two dies at an elevated temperature and pressure and for a sufficient time to further reduce the thickness of the mat to form a thin-layer composite of predetermined thickness, and to allow the isocyanate resin to interact with the wood fibers and short fibers such that the doorskin has a predetermined resistance to moisture, wherein at least one of the die surfaces has been coated with an anti-bonding agent.

The thin-layered lignocellulosic composites of the present invention may comprise a range of fiber compositions. Thus, in an embodiment, the lignocellulosic composite mixture comprises about 60% to about 95% by weight fiber.

The thin-layered wood composites of the present invention may comprise lignocellulosic fiber comprising a range of moisture levels. In an embodiment, the method does not require significant dehydrating the lignocellulosic fiber prior to treatment with the resin. Thus, in an embodiment, the lignocellulosic fiber comprises from about 7% to about 20% moisture content by weight. In another embodiment, the lignocellulosic fiber may comprise from about 8% to about 14% moisture by weight.

The organic isocyanate resin used may be aliphatic, cycloaliphatic, or aromatic, or a combination thereof. Also, although monomers may be preferred, polymeric isocyanates may also be used. In an embodiment, the isocyanate may comprise diphenylmethane diisocyanate (MDI) or toluene diisocyanate (TDI) such as Lupranate®M20FB Isocyanate (BASF Corporation, Wyandotte, Mich.) or RUBINATE™ 1840 (Huntsman Chemical, The Woodlands, Tex.). For example, in an embodiment, the isocyanate comprises diphenylmethane-4,4'-diisocyanate. Or, in an embodiment, the isocyanate is selected from the group consisting of toluene-2,4-diisocyanate; toluene-2,6-diisocyanate; isophorone diisocyanate; diphenylmethane-4,4'-diisocyanate; 3,3'-dimethyldiphenylmethane-4,4'-diisocyanate; m-phenylene diisocyanate; p-phenylene diisocyanate; chlorophenylene diisocyanate; toluene-2,4,6-triisocyanate; 4,4',4"-triphenylmethane triisocyanate; diphenyl ether 2,4,4'-triisocyanate; hexamethylene-1,6-diisocyanate; tetramethylene-1,4-diisocyanate, cyclohexane-1,4-diisocyanate; naphthalene-1,5-diisocyanate; 1-methoxyphenyl-2,4-diisocyanate; 4,4'-biphenylene diisocyanate; 3,3'-dimethoxy-4,4'-biphenyl diisocyanate; 3,3'-dimethyl-4,4'-biphenyl diisocyanate; 4,4'-dimethyldiphenylmethane-2,2',5,5'-tetraisocyanate; 3,3'-dichlorophenyl-4,4'-diisocyanate; 2,2',5,5'-tetrachlorodiphenyl-4,4'-diisocyanate; trimethyihexamethylene diisocyanate; m-xylene diisocyanate; polymethylene polyphenylisocyanates; and mixtures thereof (see e.g., U.S. Pat. No. 5,344,484, incorporated herein by reference, for a description of isocyanates that may be used to formulate wood doorskins).

Commercial preparations of the isocyanate resin material may contain not only 4,4'-methylene diphenyl diisocyanate, but also poly(methylene diphenyl diisocyanate) otherwise known as polymeric MDI (or PMDI), mixed methylene diphenyl diisocyanate isomers, and 2,4'-methylene diphenyl diisocyanate (see e.g., U.S. Pat. No. 6,620,459, incorporated herein by reference, for a discussion of the nature of non-monomeric species in commercial preparations of MDI). Still, commercially available preparations of 4,4'-methylene diphenyl diisocyanate give thin-layer composites of high consistency when used as described herein.

A range of isocyanate resin levels may be used to make the thin-layer composites of the present invention. Thus, in an embodiment, the mixture used to form the composite may comprise from about 4.5% to about 15% by weight resin solids. In another embodiment, the mixture may comprise from about 6% to about 10% by weight resin solids.

In some embodiments, it may be desirable to add a catalyst to the present composites. The addition of a catalyst to the present composites may result in one or more of faster resin cure and shorter press times, improved moisture resistance, and improved release of the thin layer composite from the dies. Exemplary catalyst contemplated as useful in accordance with the present invention may include one or more of petroleum based polyols, amines, bio-based polyols, or other catalysts known in the art. Where utilized, the catalyst may be added to the composite in an amount from about 0% to about 25%, based on resin weight, in some embodiments from about 10% to about 20% based on resin weight, in still other embodiments, from about 13% to about 17% based on resin weight.

The present composites may further comprise fillers. Fillers contemplated as useful may include one or more of pumice, shale, talc, calcium carbonate, glass flakes, aluminum trihydrate, borate, calcium sulfate, clay and/or other minerals. Where utilized, the fillers may be present in the composites in an amount from about 1% to about 30% by weight, in some embodiments, from about 5% to about 20% by weight.

The fillers may be mixed with the lignocellulosic fibers, the resin, and/or the short fibers prior to, during, or after introduction to the mold. The fillers may be sized or un-sized.

Additionally, in some embodiments, colorants may optionally be introduced to the composites. The colorant may be mixed with the other ingredients prior to, during, and/or after introduction to the mold. Suitable colorants include, but are not limited to, titanium dioxide, manganese dioxide, carbon black, or other appropriate pigments known in the art.

The conditions used to form the thin-layer composite include compressing the mixture at elevated temperature and pressure for sufficient time to allow the isocyanate resin to interact with the wood fibers such that the resultant thin-layer composite has a predetermined resistance to moisture. The exact conditions used will depend upon the equipment used, the exterior environment (e.g., temperature, relative humidity, elevation), the manufacturing schedule, the cost of input resources (e.g., starting materials, electric power), and the like. Also, varying the temperature may allow for changes to be made in the pressure used or the time of pressing; similarly, changes in pressure may require adjustment of the time and/or temperature used for pressing the thin-layer composites of the present invention.

A range of temperatures may be used to promote interaction of the isocyante resin with the lignocellulosic fibers in the mixture. In an embodiment, the temperature used to press the mixture (or preformed mat) into a thin-layer composite may range from about 250° F. (121° C.) to about 400° F. (204° C.). In another embodiment, the temperature used to press the mixture (or preformed mat) into a thin-layer composite may range from about 280° F. (138° C.) to about 370° F. (188° C.). Or, a temperature that is in the range of from about 310° F. (154° C.) to about 350° F. (177° C.) may be used.

Similarly, the levels of the pressure applied during the pressing of the thin-layer composite may vary depending on a variety of factors, such as the nature of the thin-layer composite that is being formed, the equipment being used, environmental conditions, production capabilities, and the like.

Thus, in an embodiment, the pressure during the pressing step may range from about 2500 psi (176 kg/cm$^2$) to about 150 psi (10.5 kg/cm$^2$). In another embodiment, the pressure may be applied in a step-wise manner. In another embodiment, the pressure during the pressing step ranges from about 1200 psi (84.3 kg/cm$^2$) for about 5 to about 30 seconds followed by 500 psi (35.16 kg/cm$^2$) for about 10 to about 80 seconds. For example, in one embodiment, the pressure during the pressure step ranges from about 1200 psi (84.3 kg/cm$^2$) for about 10 seconds to about 500 psi (35.16 kg/cm$^2$) for about 50 seconds.

The thin-layer lignocellulosic composites of the present invention have increased resistance to moisture-induced shrinkage and swelling. As used herein, increased resistance to moisture comprises reduced shrinking and/or swelling of the thin-layer composite when the composite is exposed to conditions of low and high moisture, respectively, as compared to thin lignocellulosic composites made by other methods, or using non-isocyanate resins. As used herein, a normal moisture level of a thin-layer composite typically ranges between 4% and 9%. Moisture contents below this range may be considered low moisture, and moisture contents above this range may be considered high moisture.

Thus, in an embodiment, when thin-layer composites of the present invention are exposed to an environment where the moisture level is low, the composite of the present invention exhibits less shrinkage than thin-layer composites made with other resins and without short fibers. Also, in an embodiment, when thin-layer composites of the present invention are exposed to an environment where the moisture level is high, the composite of the present invention exhibits less swelling than thin-layer composites made with other resins without short fibers.

For example, in an embodiment, the thin-layer composite comprises up to about 50% less linear expansion and thickness swelling after being immersed for about 24 hours in about 70° F. (about 21° C.) water than a thin-layer composite comprising comparable levels of an alternate (non-isocyanate) resin with no short fibers. Also in an embodiment, the predetermined resistance to moisture comprises a thickness swelling of less than about 15% after being immersed for about 24 hours in water at about 70° F. (about 21° C.).

Also in an embodiment, doorskins made by the methods of the present invention are significantly less dense than doorskins made using traditional formaldehyde-based resins. Thus, in an embodiment, the thin-layer lignocellulosic composites of the present invention comprise a density of less than about 60 pounds per cubic foot (about 962 kg/m$^3$). In another embodiment, the thin-layer lignocellulosic composites of the present invention may comprise a density of less than about 55 pounds per cubic foot (about 881.5 kg/m$^3$).

Several methods have been explored to produce wood composites that exhibit increased resistance to moisture uptake and loss. It is believed that swelling and/or shrinking of wood is, at least partially, the result of water reacting with hydroxyl groups present in cellulose and hemicellulose. Thus, high moisture levels increase the amount of water bound to the wood fiber. Alternatively, in low humidity, water is lost from the wood fibers.

Wood may be treated with chemical agents to modify the hydroxyl groups present in the cellulose and to thereby reduce the reactivity of cellulose fibers with water. For example, acetylation of cellulose fibers can reduce the number of hydroxyl groups available to react with water and thus, makes the wood less susceptible to heat-induced drying or moisture-induced swelling. Still, on a large scale, acetylation may not be commercially viable as, at the time of filing the present application, it is expensive to acetylate wood.

The present invention is concerned with methods to employ isocyanate resins to improve the moisture-resistance of thin-layer lignocellulosic composites, such as, but not limited to, wood doorskins. Isocyanate resins such as diphenyl-methane-4,4'-diisocyanate (MDI) and toluene diisocyanate (TDI) resin are highly effective in modifying the reactive groups present on cellulose fibers to thereby prevent the fibers from reacting with water. It is believed that the isocyanate forms a chemical bond between the hydroxyl groups of the wood cellulose, thus forming a urethane and/or polyurea linkage.

Efforts to develop isocyanate resins for thin-layer wood composites are described in U.S. Pat. No. 3,440,189, describing the use of isocyanate resin and a basic catalyst, U.S. Pat. No. 4,100,138, describing the use of an isocyanate and a polyether polyol binder, as well as U.S. Pat. No. 4,359,507, describing use of isocyanates mixed with ethylene carbonate and propylene carbonate as a binder. Also, U.S. Pat. No. 6,620,459 describes a method for impregnating wood substrates with an isocyanate resin by dipping the wood in the resin followed by subsequent polymerization steps, and U.S. Pat. Nos. 4,388,138 and 4,396,673 describe use of a binder of polyisocyante and a wax release agent. U.S. Pat. No. 5,344,484 describes the use of low-temperature pressing to prepare isocyanate-bonded wood composites described as having high surface strength but porous enough such that adhesives can bond the treated thin-layer composite to an underlying wood frame. U.S. Pat. No. 5,344,484 describes that such wood composites include 1 to 4% isocyanate resin. Still, it has been found that such low levels of resin do not provide sufficient levels of moisture resistance to thin-layer wood composites for exterior or severe interior environments.

FIG. 1 shows an overview of a general method used to prepare doorskins. Generally, a selected wood starting material is ground to prepare fibers of a substantially uniform size and an appropriate amount of release agent is added. At this point the preparation may be stored until further processing. The blend may then be mixed with an appropriate binder resin (e.g., using atomization), catalyst, short fibers and optionally a filler, until a uniform mixture is formed. It is also common to add the resin to the fiber prior to storage of the fiber.

The mixture may then be formed into a loose mat which is modified to the desired weight per square foot by using a shave-off roller and pre-compressed to a density of about 3 to about 12 pounds per cubic foot. After further trimming to the correct length and width, a release agent may be applied to the surface of the mat, the pre-pressed mat is introduced into a platen press, and compressed between two dies under conditions of increased temperature and pressure. For example, standard pressing conditions may comprise pressing at about 320° F. at about 1200 psi for about 25 seconds followed by about 20 seconds at about 500 psi (i.e., about 160° C. at about 84.3 kg/cm$^2$ for about 25 seconds followed by about 20 seconds at about 35.2 kg/cm$^2$). Generally, a recessed (female) die is used to produce the inner surface of the doorskin, and a male die shaped as the mirror image of the female die is used to produce the outside surface of the skin. Also, the die which is forming the side of the doorskin that will be the outer surface may include an impression to create a woodgrain pattern. After cooling, sizing, priming, and/or humidifying the resulting doorskin is mounted onto a doorframe using a standard adhesive and employing methods standard in the art.

Embodiments of the present invention recognize that the use of a release agent and/or an anti-bonding agent during the manufacture of wood composite doorskins allows for increased levels of resin to be used for the manufacture of doorskins made by low-temperature pressing.

Thus, in an embodiment (FIG. 2), the present invention describes a method for making a thin-layer wood composite having increased water resistance comprising forming a wood composite mixture 2 comprising: (i) a refined wood fiber 4; (ii) about 2 to about 25% by weight short fibers; (iii) greater than about 5% by weight of an organic isocyanate resin; and (iv) at least about 1% by weight of an internal release agent (FIG. 2(a)). Optionally, catalyst and/or fillers may be added. The mixture may be prepared in bulk using standard blowline blending of the resin and fibers. Or, blenders 9 having a means for mixing 3 such as a paddle or the like, may be used.

Next, the wood composite mixture may be formed into a loose mat in a forming box. The mat is then pre-shaped using a shave-off roller (not shown in FIG. 2) and precompressed using a roller or some other type of press 7 (FIG. 2(b)). The specific density of the mat may vary depending on the nature of the wood composite being formed, but generally, the mat is formed to have a density of about 3 to about 12 pounds per cubic foot (i.e., 48-192 kg per cubic meter). After further trimming of the mat to the correct length and width, at least one surface of the mat may be exposed to additional release agent 8 by spraying the release agent onto the surface of the mat 6 using a spinning disc applicator spray nozzle, or other application means 11 (FIG. 2(c)). Also, shown in FIG. 2 are conveyors 5 and 13 as a means for transferring the wood composite from one station to another. It is to be understood that other means of supporting or transferring the thin-layer wood composite from one station to another, or supporting the composite during the processing steps may be used.

The mat 6 may then be placed between a male die 14 and a female die 12, and pressed at an elevated temperature and pressure and for a sufficient time to further reduce the thickness of the thin-layer composite and to allow the isocyanate resin to interact with the wood fibers (FIG. 2(d)). As described above, it is believed that by heating the wood composite in the presence of the resin, the isocyanate of the resin forms a urethane or polyurea linkage with the hydroxyl groups of the wood cellulose. Modification of the hydroxyl groups of the cellulose with the urethane linkage prevents water from hydrating or being lost from with the cellulose hydroxyl groups. Thus, once the resin has cured, a doorskin having a predetermined resistance to moisture is formed. As described above, in an embodiment, one of the dies may be coated with an anti-bonding agent. FIG. 2 shows an embodiment in which the female die 12 is coated on its inner surface with an anti-bonding agent 10.

In alternative embodiments, both dies (12 and 14) are coated with anti-bonding agent. For example, this embodiment may be preferred where both die surfaces do not have a grain pattern, but are smooth. Or, in an embodiment, both inner die surfaces may be coated with an anti-bonding agent, and the use of release agent to coat the mat may vary depending upon the particular wood composite being prepared. Or, in an embodiment, the method may employ release agent on the surface of the mat, without coating of the dies. In yet another embodiment, the method may employ an internal release agent in the mat, without coating of the dies.

Subsequently, the doorskin is allowed to cool (FIG. 2(e)) and then further processed (sizing, humidifying, and priming) prior to being applied to a doorframe.

Thus, the invention describes using a release agent and/or anti-bonding agent to prevent the thin-layer wood composite from sticking to the pressing dies during production.

The release agent and/or anti-bonding agent used to prevent the mat from sticking to the dies during production may be applied to the mat in various ways. Generally, when the mat is used to produce a standard doorskin, one of the dies comprises a recess and is described as the female die. Referring to FIG. 2, usually the female die 12 is positioned underneath the lower surface 18 of the mat, which is the surface of the mat that is adhered to the underlying doorframe (i.e., the inner surface). The other (upper) surface of the mat 16 corresponds to the side of the doorskin that will be on the outside of the door. Often, this side of the doorskin will include a grain texture to improve the decorative effect. The die 14 used to press the upper side of the mat (i.e. the eventual outside of the door) may be termed the male die. Thus, the male die includes a protruding portion that is the mirror image of the recess on the female die, and optionally, a grain-like pattern on the surface of the die.

In one embodiment, an anti-bonding agent is coated onto the bottom (female) die. Depending on the actual anti-bonding agent used, the coating may be baked onto the bottom die. In this way, the coated die may be used several times before recoating with additional anti-bonding agent. For example, in an embodiment, the step of baking the anti-bonding agent onto the die surface comprises: (i) cleaning the die surface substantially free of contaminants, such as dirt, dust or grease; (ii) spraying about 0.003 inches (3 mils; 0.726 mm) of a about 50% solution of the anti-bonding agent onto the die; and (iii) baking the die at over about 300° F. (about 149° C.) for about 1-4 hours. In an embodiment, the step of cleaning the die comprises cleaning the die surface with a degreaser; wire brushing to remove solids; wiping the die surface with a solvent (such as acetone); and buffing with a cotton pad. The anti-bonding agent is then applied in multiple layers to provide a 3 mil thickness; and the dies heated to bake the coating onto the die.

Under suitable conditions, the anti-bonding agent that is baked onto the die (or dies) is stable enough to the pressing conditions such that the die(s) can be used for over 2000 pressing cycles prior to requiring a second coating with additional anti-bonding agent. Anti-bonding agents that are suitable for baking onto the die surface include CrystalCoat MP-313 and Silvue (SDC Coatings, Anaheim, Calif.), ISO-Strip-23 Release Coating (ICI Polyurethanes, West Deptford, N.J.), 7004W (Chemtrend, Howell, Mich.) aminoethlyaminopropyltrimethoxysilane (Dow Corning Corporation), or the like.

Although one method to facilitate removal of the doorskin from the die uses a die coated with anti-bonding agent, other equivalent methods to facilitate non-sticking of the wood composite to the die may be incorporated into the methods of the present invention. For example, to facilitate release of the doorskin, the die(s) may be nickel or chrome plated, covered with a ceramic layer, coated with fluorocarbons, or plated with other materials to prevent bonding of the resin to the die.

As described above, a release agent may be sprayed onto one of the surfaces of the pre-pressed mat prior to the mat being pressed between the dies. For example, and referring again to FIG. 2, a release agent 8 may be sprayed onto the upper surface 16 of the mat 6 which is exposed to the male die 14, Preferably, the release agent 8 sprayed directly onto the surface of the mat is a release agent that is compatible with the wood and resin making up the composite. Preferably, the release agent sprayed on the wood comprises compounds such as AQUACER™ 593, PAT®-7299/D2, PAT®-1667 (Wurtz GmbH & Co., Germany), and the like.

The amount of release agent sprayed onto at least one side of the mat may range from about 0.1 to about 8.0 grams per square foot (1.1 to 86.1 grams per square meter) of mat. For example, the release agent may be sprayed onto the mat as an about 25%-100% aqueous solution. In an embodiment, the amount of release agent sprayed onto at least one side of the mat may comprise about 14 grams per square foot (i.e., 11 grams per square meter) of mat sprayed as a 100% aqueous solution. The 100% aqueous solution may be water.

Alternatively, the release agent may be added directly to the mixture used to form the wood composite. In this embodiment, the release agent comprises up to about 0.05 to about 2% by weight of the composite. For example, the release agent may be added as a solution (typically about 25% to 50% solids) and blended with the wood fiber, short fibers and resin. This approach has the advantage of not requiring equipment to spray the release agent onto the mat. Adding the release agent as part of the wood composite may require the use of more release agent than when only the surface of the composite is exposed. In some cases (e.g., low production runs) the cost of the extra materials is justified since the production set-up is simplified.

The release agent used to coat the mat is distinct from the anti-bonding agent used to coat the die surface(s). The anti-bonding agent used to coat the die surface(s) generally may comprise agents such as silane or silicone based chemicals that are known to be effective coating agents. These anti-bonding agents, however, are not always suitable for spraying directly on the wood mat (or incorporating into the wood composite) since silane or silicone based compounds can interfere with later finishing of the wood product by priming and/or painting. Waxes may also act as release agents to some extent. Still, it was found that waxes common to the door manufacturing industry are generally not particularly effective in preventing the wood composite from sticking to either the male or female dies.

Also, the release agent may be clear, or it may include a pigment. For example, a tinted release agent may facilitate subsequent priming or painting of the door.

As described herein, the present invention describes the use of isocyanate resins to prepare wood composites. One of the advantages of using isocyanate resins rather than formaldehyde crosslinked resins is that less energy is needed to dry the wood fiber prior to pressing the mat. As described herein, traditional phenol-formaldehyde resins are not compatible with wood having a water content much greater than about 8%, as the water tends to interfere with the curing process. Also, excess moisture in the wood fiber can cause blistering when pressed with melamine-formaldehyde resins or urea-formaldehyde resins. Thus, for wood having a moisture content of greater than about 8%, the wood must be dried for the curing step, and then re-hydrated later. In contrast, isocyanate-based resins are compatible with wood having a higher water content and thus, curing with isocyanate-based resins may obviate the need for the drying and the re-hydrating steps associated with formaldehyde-based resins.

In an embodiment, the press time and temperature may vary depending upon the resin used. For example, using a toluene diisocyanate (TDI) resin as opposed to diphenylmethane diisocyanate (MDI) resin may shorten the press time by as much as about 10%. Generally, when using isocyanate resins, very high temperatures are not required; thus, isocyanate resins are associated with decreased energy costs and less wear on the boiler. Still, composites made at very low temperatures do not display sufficient resistance to moisture to be commercially useful. Thus, the temperature used for pressing may range from about 250° F. to about 400° F. (about 121° C. to about 204° C.), or more preferably, from about 280° F. to about 370° F. (138° C. to about 188° C.). In an embodiment, the temperature ranges from about 310° F. (about 154° C.) to about 350° F. (about 177° C.).

The pressure used during pressing may be constant, or varied in a step-wise fashion. Depending upon the selected temperature and pressure conditions used for pressing, the total pressing time may range from about 30 seconds to about 5 minutes or more. Thus, the pressure during the pressing step may include ranges from about 2500 psi (176 kg/cm$^2$) to about 150 psi (10.5 kg/cm$^2$). Or, the pressure may be applied in a step-wise manner. For example, the pressure during the pressing step may range from about 1200 psi (84.3 kg/cm$^2$) for about 5 to about 20 seconds followed by about 500 psi (about 35.16 kg/cm$^2$) for about 20 to about 80 seconds. In one embodiment, the pressure during the pressure step ranges from about 1200 psi (about 84.3 kg/cm$^2$) for about 10 seconds to about 500 psi (about 35.16 kg/cm$^2$) for about 50 seconds.

The present invention also encompasses wood products comprising wood composites made by the method of the invention. For example, in one aspect, the present invention comprises a wood composite comprising a mixture of: (a) no more than about 95% by weight of a wood fiber, wherein the wood fiber has a predetermined moisture content; (b) at least about 5% by weight of an organic isocyanate resin; (c) at least about 0.5% by weight short fibers; (d) at least about 0.5% by weight of an internal release agent; (3) optionally, at least about 0.1% by weight wax; (f) optionally, at least about 0.5% catalyst, (g) optionally at least about 1% filler and (g) optionally, at least about 0.2 grams release agent per square foot (about 2.15 grams per square meter) as applied to the surface of the composite.

Preferably, wood composites made by the method of the invention comprise significantly less linear expansion and swelling than wood composites made by conventional methods. Thus, doorskins made by the method of the present invention exhibit about 50% less linear expansion and thickness swelling than composite doorskins made with formaldehyde-based resins of the same content (such as, for example, 8% melamine-urea-formaldehyde doorskins) when boiled in water for about 2 hours. Also, doorskins made by the present invention exhibit about 50% less linear expansion than non-isocyanate based doorskins when immersed in water for about 24 hours at about 70° F. (about 21.1° C.), a standard test used in the industry (ASTM D1037).

As described above, the thin-layer lignocellulosic composites of the present invention comprise a predetermined thickness, such that the resultant composite comprises a flat planar structure. In an embodiment, the predetermined thickness ranges from about 0.050 inches to about 0.625 inches (about 1.27 mm to about 15.88 mm). In an alternate embodiment, the predetermined thickness of the thin-layer composite may range from about 0.105 to about 0.130 inches (about 2.67 to about 3.30 mm).

Also in an embodiment, doorskins made by the methods of the present invention are significantly less dense than doorskins made using traditional formaldehyde-based resins. For a doorskin that is about 0.12 inches (about 3.05 mm) thick and has about 10% melamine-urea-formaldehyde resin and about 1.5% wax, the density is about 58 pounds per cubic foot (about 930 kg/m$^3$). In contrast, doorskins of the present invention (about 8% MDI resin; about 0.5% release agent) may have a density as low as about 50 pounds per cubic foot (about 801 kg/m$^3$).

Thus, it was found that addition of 2-4 g per square foot of a release agent to the upper surface of the pre-pressed mat, and baking the anti-bonding agent Silvue (SDC Coatings) onto the female (bottom) die allowed for easy removal of the doorskins having about 1% to about 10% MDI resin from both dies easily. Additionally, it was determined that over 200 press loads could be made prior to recoating the male or female die with additional antibonding agent.

The wood composites made by the method of the invention demonstrated significantly less linear expansion and swelling than wood composites made by conventional methods. Thus, doorskins made by the method of the present invention exhibited about 50% less linear expansion and thickness swelling than composite doorskins made with formaldehyde based resins of the same content (e.g., 8% melamine-urea-formaldehyde doorskins) when boiled in water for about 2 hours. Also, doorskins made by the present invention exhibited about 50% less linear expansion than comparable formaldehyde-based doorskins than non-isocyanate based doorskins when immersed in water for about 24 hours at about 70° F. (about 21.1° C.), a standard test used in the industry (ASTM D1037).

Also, doorskins made by the methods of the present invention were found to be significantly less dense than doorskins made using traditional formaldehyde-based resins.

In an embodiment, the present invention provides methods of making building structures (e.g., headers, jambs, sashes, and stiles) that are not thin-layered structures. For example, to make door jambs and window sills that may have the entire structure, or a substantial portion thereof, comprising the fiber-reinforced polymer of the present invention, components used to make the polymer (e.g., an isocyanate and an isocyanate-reactive compound) may be mixed, and the mixture poured into a mold having an internal volume that comprises the door frame part of interest. Or, the mold may be designed to manufacture plant-on structures for doors. Or, the mold may be designated to manufacture window parts or window frame parts. Or, molds designated to manufacture siding, shutters, and/or shingles may be used. Generally, the methods of the present invention may be used with standard molds that are used to manufacture the building part of interest. In one embodiment, the mold comprise fluting or other decorative shaping. Where such additional shaping is included, the polymer layer at the surface will include the additional shaping.

Accordingly, the present methods form composites that have increased resistance to moisture-induced shrinking and/or swelling as compared to composites with similar concentrations of non-isocyanate resins. The present methods also may be used to form composites having comparable resistance to moisture-induced shrinking and/or swelling as composites having greater concentrations of isocyanate resins. The inventors, therefore, have developed methods and products demonstrating reduced emissions of Hazardous Air Pollutants (HAP), while maintaining and improving the physical characteristics of the composites using concentrations previously understood to be unworkable. The Hazardous Air Pollutant reduction is significant and may allow the composite plant to comply with the EPA Maximum Achievable Control Technology (MACT) regulation without installing engineering controls.

The present methods also result in reduced energy costs, high-throughput production, and reduced over-all costs while maintaining the necessary moisture resistance of the composites.

It will be understood that each of the elements described above, or two or more together, may also find utility in applications differing from the types described. While the invention has been illustrated and described as a method for high-throughput preparation of thin-layer lignocellulosic composites, such as doorskins, it is not intended to be limited to the details shown, since various modifications and substitutions can be made without departing in any way from the spirit and scope of the present invention. As such, further modifications and equivalents of the invention herein disclosed may occur to persons skilled in the art using no more than routine experimentation, and all such modifications and equivalents are believed to be within the spirit and scope of the invention as described herein.

That which is claimed is:

1. A thin-layer lignocellulosic composite comprising:
   a mixture of no more than about 95% by weight of at least one type of lignocellulosic fiber,
   at least about 5% by weight of an isocyanate resin, and
   at least about 2% by weight of short fibers comprising fiberglass wherein the short fibers comprise an average length from about 0.03 inches to about 2.0 inches,
   wherein the mixture is pressed between two dies at an elevated temperature and pressure and for a sufficient time to form the thin-layer composite with a thickness which ranges from about 0.050 inches (about 1.27 mm) to about 0.625 inches (about 15.88 mm).

2. The thin-layer lignocellulosic composite of claim 1, wherein the lignocellulosic fiber comprises wood.

3. The thin-layer lignocellulosic composite of claim 1, further comprising a release agent.

4. The thin-layer lignocellulosic composite of claim 3, wherein the release agent is added to the mixture prior to pressing the mixture into a thin-layer composite.

5. The thin-layer lignocellulosic composite of claim 4, wherein the amount of release agent added to the composite ranges from about 0.1% to about 5% by weight.

6. The thin-layer lignocellulosic composite of claim 3, wherein the mixture is preformed into a loose mat, and the release agent is sprayed onto at least one surface of the mat prior to pressing the mixture into a thin layer composite.

7. The thin-layer lignocellulosic composite of claim 6, wherein the amount of release agent sprayed on to the mat surface comprises about 0.1 to about 8.0 grams per square foot (about 1.1 to about 86.1 grams per square meter) of the surface.

8. The thin-layer lignocellulosic composite of claim 3, wherein the release agent comprises a pigment.

9. The thin-layer lignocellulosic composite of claim 1, wherein the lignocellulosic fiber ranges from about 60% to about 95% by weight.

10. The thin-layer lignocellulosic composite of claim 1, wherein the isocyanate resin comprises diphenylmethane diisocyanate (MDI) or toluene diisocyanate (TDI).

11. The thin-layer lignocellulosic composite of claim 1, wherein the isocyanate resin comprises diphenylmethane-4,4'-diisocyanate.

12. The thin-layer lignocellulosic composite of claim 1, wherein the mixture comprises from about 5.5% to about 15% by weight resin solids.

13. The thin-layer lignocellulosic composite of claim 1, wherein the mixture comprises from about 6% to about 10% by weight resin solids.

14. The thin-layer lignocellulosic composite of claim 1, wherein the short fibers are present in the composite in an amount from about 2% to about 40% by weight.

15. The thin-layer lignocellulosic composite of claim 1, wherein the short fibers are present in the composite in an amount from about 5% to about 15% by weight.

16. The thin-layer lignocellulosic composite of claim 1, wherein the short fibers comprise an average length from about 0.06 inches to about 1.5 inches.

17. The thin-layer lignocellulosic composite of claim 1, wherein at least about 90% by weight of the short fibers have a length less than about 1.5 inches.

18. The thin-layer lignocellulosic composite of claim 1, wherein at least about 99% by weight of the short fibers has a length less than about 1.5 inches.

19. The thin-layer lignocellulosic composite of claim 1, further comprising a catalyst.

20. The thin-layer lignocellulosic composite of claim 1, wherein the composite is substantially free of added wax.

21. The thin-layer lignocellulosic composite of claim 1, wherein the composite is substantially free of wax.

22. The thin-layer lignocellulosic composite of claim 1, wherein the mixture is pressed between two dies at an elevated temperature and pressure and for a sufficient time to form a composite which comprises up to about a 50% reduction in linear expansion and thickness swelling after being immersed for about 24 hours in about 70° F. (about 21° C.) water compared to a thin-layer composite comprising a resin that does not include isocyanate resin and short fibers.

23. The thin-layer lignocellulosic composite of claim 1, wherein the mixture is pressed between two dies at an elevated temperature and pressure and for a sufficient time to form a thin-layer composite which comprises a thickness swelling of less than about 15% after being immersed for about 24 hours in water at about 70° F. (about 21° C.).

24. The thin-layer lignocellulosic composite of claim 1, further comprising a filler.

25. The thin-layer lignocellulosic composite of claim 24, wherein the filler is selected from one or more of pumice, shale, talc, calcium carbonate, glass flakes, aluminum trihydrate, borate, calcium sulfate, and clay.

26. The thin-layer lignocellulosic composite of claim 1, further comprising a density of less than about 60 pounds per cubic foot (about 962 kg/m$^3$).

27. The thin-layer lignocellulosic composite of claim 1, wherein the composite is a door skin.

28. A door comprising the thin-layer composite according to claim 1.

* * * * *